Sept. 20, 1932.  N. D. POTTER  1,878,320
CAMERA SUPPORT
Filed Nov. 20, 1931  2 Sheets-Sheet 1

INVENTOR
Nathan Dumont Potter,
BY
ATTORNEY

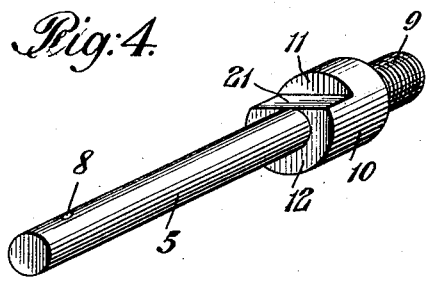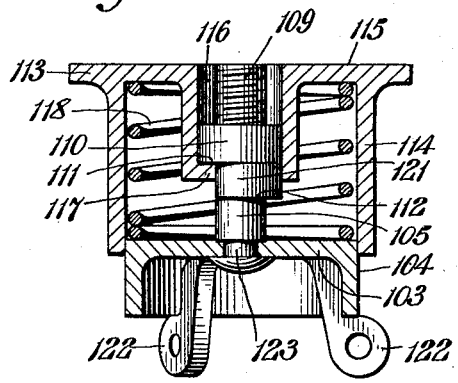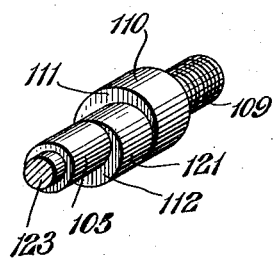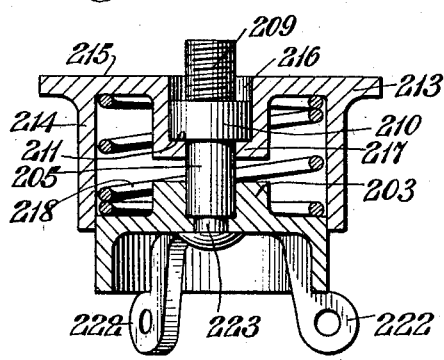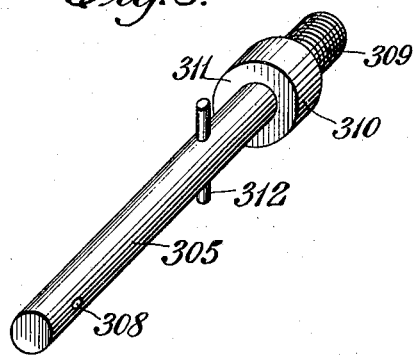

Patented Sept. 20, 1932

1,878,320

UNITED STATES PATENT OFFICE

NATHAN DUMONT POTTER, OF ENFIELD, MASSACHUSETTS

CAMERA SUPPORT

Application filed November 20, 1931. Serial No. 576,235.

My invention consists in the novel features hereinafter described, reference being had to the accompanying drawings, which show several embodiments of the invention selected by me for purpose of illustration and the said invention is fully disclosed in the following description and claims.

The object of my invention is to provide a simple, inexpensive and practical camera support which, in its preferred form, consists of a single staff or leg, the upper end of which is provided with a bolt having a terminal thread for engaging the internally threaded collar usually provided on all cameras and having in association therewith, a a cap, movable longitudinally and rotatively with respect to the head of the support and having a top friction surface and a recess therein coaxial with the bolt and preferably enclosing the threaded portion of the bolt when in normal position. A coilspring is interposed between the cap and the head of the support and the bolt is provided preferably with two locking shoulders at different distances from the terminal end of the threaded portion, while the cap is provided with a locking portion normally engaging the outermost shoulder but capable of being brought into engagement with the inner shoulder to hold the cap with the threaded portion of the bolt partly exposed to engage the collar and camera. The cap is also provided with a part which is conveniently the lower face of the locking portion, which may be brought into contact with a rigid part of the head to lock the threaded portion of the bolt with respect to the collar on the camera and prevent the bolt from unscrewing. When the threaded portion of the bolt is screwed into the camera far enough to move the cap downward out of contact with the inner shoulder of the bolt, the tension of the spring will force the friction face of the cap firmly against the bottom of the camera and tend to hold it against turning, even if the depth of the threaded portion of the collar should not be sufficient to force the cap rigidly into engagement with the head. The preferred form of my invention has the advantage that it can be used as a cane or walking stick, and as the threaded portion of the bolt is entirely enclosed within the recess of the cap, it does not come in contact with the hand, while the construction in itself is extremely cheap, light, and at the same time, efficient.

It is to be understood that my invention is also applicable to camera supports of the tripod type, having a plurality of ground engaging legs or supports, and I have illustrated modifications of my preferred form which are especially adapted for that purpose.

My invention also comprises certain novel features of construction and combination of parts hereinafter fully described and particularly pointed out in the claims.

Referring to the accompanying drawings,

Fig. 4 is a detailed perspective view of the bolt shown in the preceding figures.

Fig. 5 is a vertical sectional view of a modified embodiment of my invention adapted for use with three supporting legs.

Fig. 6 is a detailed perspective view of the bolt shown in Fig. 5.

Fig. 7 is a view similar to Fig. 5 showing the slight modification.

Fig. 8 is a detailed perspective view showing another form of bolt, in this instance, adapted for use in the construction shown in Figs. 1, 2, 3.

Referring to the embodiment of my invention illustrated in Figs. 1 to 4 inclusive, which represents the application of my invention to a camera support of the monopod type, 1 represents a staff provided at its lower end with the ferrule, 2, and having at its upper end a head portion indicated at 3, the outer surface, 4, of which is preferably cylindrical and forms a guiding portion for engaging the cap. This staff may be made wholly of wood or of wood and metal or of metal, in which case it may be conveniently formed hollow. Projecting beyond the upper end of the head is a bolt, 5, disposed coaxially with the cylindrical guiding portion, 4, of the head. As shown, the lower end of the bolt is inserted in an aperture in the head and secured rigidly therein by a lateral screw, 6, having a portion, 7, extending through a transverse hole, 8, in the bolt, but it may be secured in other ways. The upper terminal portion of the bolt is threaded as indicated at 9, and below the threaded portion is a cylindrical guiding portion, 10, preferably of greater diameter than other portions of the bolt, the said guiding portions being preferably provided with shoulders, 11 and 12, respectively located at different distances from the upper end of the bolt. 13 represents a cap having a sleeve portion, 14, to engage with a sliding fit, the guiding portion, 4, of the head and having an outer friction surface, 15, in which is located a central recess, 16, coaxial with the bolt and adapted to engage the guiding portion, 10, thereof and to completely enclose the threaded portion, 9, as clearly shown in Fig. 1. The cap is provided with a locking portion indicated at 17 preferably at the bottom of the recess, 16, which normally engages the outer shoulder, 11, of the bolt, but it is capable of being brought into engagement with the inner shoulder, 12, by pressing the cap inwardly and rotating it with respect to the head. A coiled spring, 18, is interposed between the cap and the head, 3, so that it normally presses the cap outwardly with respect to the head and the bolt.

Figure 1:
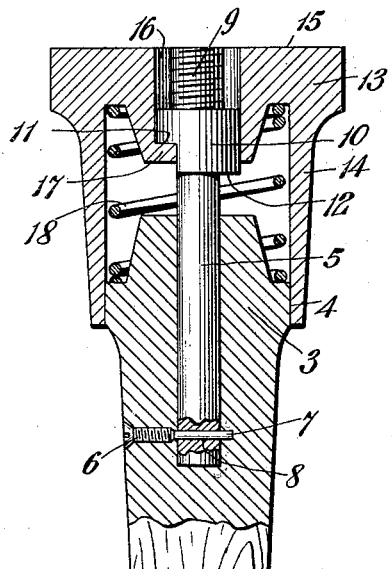
Fig. 1 is a side elevation partly broken away and partly in section, illustrating the preferred form of my invention.
Figure 2:
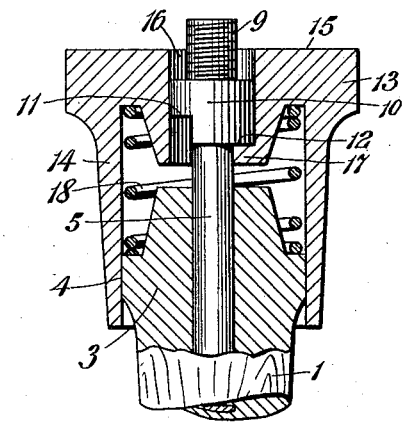
Fig. 2 is a sectional view partly in elevation showing the upper end of the device with the cap locked in position to expose a part of the screw or threaded portion of the bolt.
Figure 3:
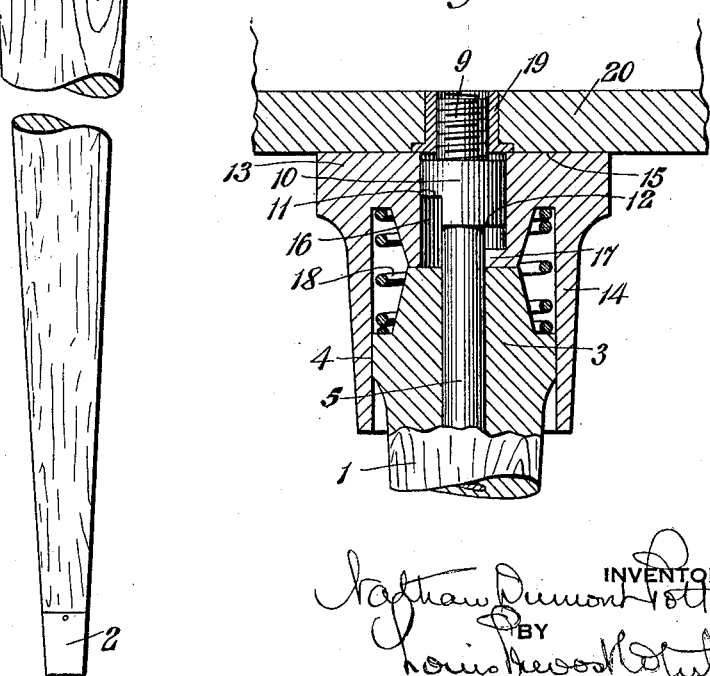
Fig. 3 is a similar view showing a portion of the camera with the screw collar thereof engaging the screw which has been screwed in far enough to bring the cap into locking engagement with the head.

It will be seen that this device, as just described, forms a very practical and convenient staff or cane. When it is desired to use it as a camera support, the cap, 13, is pressed downwardly so as to carry the locking portion, 17, below the inner shoulder, 12, and the cap is rotated slightly in order to bring the locking portion, 17, into engagement with the shoulder, 12. This projects the threaded portion, 9, above the friction face, 15, of the cap in position to engage the collar, 19, (see Fig. 3) in the bottom of the camera which is therein indicated at 20. The threaded portion, 9, is inserted in the collar, 19, and the staff is rotated so as to screw the threaded portion into the collar and bring the friction face, 15, of the cap into engagement with the camera bottom, 20. The collar, 19, differs in length in different cameras. If its length is sufficient, the threaded portion, 9, is screwed into it so as to gradually force the cap in a direction toward the head, 3, until a part connected with the cap, preferably the lower face of the locking projection, 17, engages a fixed part of the head as indicated in Fig. 3. This acts as a lock to hold the threaded portions, 9 and 19, against unscrewing.

If the collar, 19, is not of sufficient length to force the cap into rigid engagement with the head as above described, it nevertheless follows that as soon as the threaded portion, 9, has been screwed into the collar far enough to force the cap downward against the spring, 18, and disengage the locking portion, 17, from the inner shoulder, 12, the pressure of the spring will force the friction face, 15, of the cap into firm engagement with the bottom of the camera, 20, and tend to prevent accidental turning of the camera with respect to the support. In the form of bolt illustrated in Figs. 1 to 4, a part of the guiding portion, 10, is cut away at one side between the shoulders, 11 and 12, as indicated at 21 to accommodate the locking portion, 17, of the cap.

In Figs. 5 and 6, in which the parts corresponding with those previously described, are given the same reference numerals with the addition of one hundred, I have shown a slight modification of my invention particularly adapted for the tripod type of support. In this form, the head, 103, is made of metal and is provided with three hinge lugs indicated at 122, two of which are shown in the sectional view, Fig. 5. The inner end of the bolt, 105, is provided with reduced portion, 123, adapted to extend through an aperture in the head, 103, and to be conveniently riveted or upset to attach it rigidly to the head. The portion of the bolt between the shoulders, 111 and 112, is, in this case, in the form of an eccentric as indicated at 121. Otherwise the construction and operation of the parts is exactly the same as hereinbefore described except that the head is provided with three legs or ground engaging supports instead of a single staff.

Fig. 7 shows a slight modification of the construction shown in Fig. 5 and the corresponding parts are given the same reference numerals with the addition of two hundred. In some instances, and particularly in the tripod type, it may not be important that the threaded portion, 209, shall be entirely enclosed within the recess, 216, of the cap and in such case, only a single shoulder, as 211, end be provided on the bolt below the guiding portion, 210, thereof. In this case, the inner portion of the bolt, 205, passes through an aperture in the bottom of the recess, 216, of the cap the surrounding portions, 217, of which engage the shoulder, 211, and hold the parts normally in position with the threaded portion of the bolt projecting slightly from the recess and far enough to engage the collar on the camera. When the threaded portion, 209, is screwed into the collar, the camera will force the cap, 213, downward until the bottom face of the locking portions, 217, engage the upper face of the head, 203, and lock the threaded portions against unscrewing.

Fig. 8 shows another modified form of the bolt in which the parts corresponding with those previously described are given the same reference numerals with the addition of three hundred. In this figure which shows a bolt of the type illustrated in Fig. 4 for a monopod, the outer shoulder, 311, is formed by the bottom of the guiding portion, 310, which engages the recess in the cap and the second or inner shoulder is formed by a transverse pin, 312, extending through a transverse aperture in the bolt and so disposed with respect to the locking portion as 17 Figs. 1 to 3, or 117, Fig. 5, that the locking portion can be moved downwardly, past the pin, 312, and locked in engagement therewith by slightly rotating the cap to bring the pin above the locking portion.

It will be understood that the ground supporting means herein referred to, whether of the monopod or tripod type, may be of any desired length according to the type of camera with which the device is to be used, and may be extensible or telescopic, as to either the monopod or tripod type, if desired. It will also be understood that my invention is applicable to all types of cameras, box cameras, folding cameras, reflex cameras, moving picture cameras, or any other type of camera or other device which it may be desired to support.

What I claim is:

1. In a camera support the combination with a head provided with ground engaging supporting means, a bolt secured to said head, and projecting above the same, having a guiding portion of enlarged diameter and a threaded portion above the guiding portion, and forming a shoulder at the lower end of the guiding portion, of a cap having a sleeve portion fitting said head and movable longitudinally with respect thereto, said cap having a top friction surface, a guiding recess therein engaging the guiding portion of the bolt and of greater depth than said guiding portion and provided with a locking portion to engage said shoulder, and a spring interposed between said head and said cap.

2. In a camera support the combination with a head provided with ground engaging supporting means, a bolt secured to said head, and projecting above the same, having a guiding portion of enlarged diameter and a threaded portion above the guiding portion, and forming a shoulder at the lower end of the guiding portion, said bolt being provided with a second shoulder below said first mentioned shoulder, of a cap having a sleeve portion fitting said head and movable rotatably and longitudinally with respect thereto, said cap having a top friction surface provided with a recess enclosing the threaded portion of said bolt and engaging the guiding portion thereof, and being provided with a locking projection for engaging one or other of said shoulders, and a spring interposed between said head and said cap.

3. In a camera support the combination with a head provided with ground engaging supporting means, a bolt secured to said head, and projecting above the same, having a guiding portion of enlarged diameter and a threaded portion above the guiding portion, and forming a shoulder at the lower end of the guiding portion, said bolt being provided with a second shoulder below said first mentioned shoulder, of a cap having a sleeve portion fitting said head and movable rotatably and longitudinally with respect thereto, said cap having a top friction surface provided with a recess enclosing the threaded portion of said bolt and engaging the guiding portion thereof, the bottom of said recess being cut away to provide a locking portion, normally engaging said first mentioned shoulder, but capable of being moved below said second shoulder and turned to lock it in position therewith to maintain the threaded portion of the bolt in projected position, and a spring interposed between said head and said cap.

4. In a camera support the combination with a head provided with ground engaging supporting means, a bolt secured to said head, and projecting above the same, having a guiding portion of enlarged diameter and a threaded portion above the guiding portion, and forming a shoulder at the lower end of the guiding portion, said bolt being provided with a second shoulder below said first mentioned shoulder, of a cap having a sleeve portion fitting said head and movable rotatably and longitudinally with respect thereto, said cap having a top friction surface provided with a recess enclosing the threaded portion of said bolt and engaging the guiding portion thereof, the bottom of said recess being cut away to provide a locking portion, normally engaging said first mentioned shoulder, but capable of being moved below said second shoulder and turned to lock it in position therewith to maintain the threaded portion of the bolt in projected position, and a spring interposed between said head and said cap, said cap having a portion adapted to be forced into rigid engagement with a part of said head when the threaded portion of the bolt is engaged with the threaded collar of a camera, to lock the threaded connections against unscrewing.

5. In a camera support the combination with a head provided with ground engaging supporting means, a bolt secured to said head, and projecting above the same, having a guiding portion of enlarged diameter and a threaded portion above the guiding portion, and forming a shoulder at the lower end of the guiding portion, said bolt being provided with a second shoulder below said first mentioned shoulder, of a cap having a sleeve portion fitting said head and movable rotatably and longitudinally with respect thereto, said cap having a top friction surface provided with a recess enclosing the threaded portion of said bolt and engaging the guiding portion thereof, the bottom of said recess being cut away to provide a locking portion, normally engaging said first mentioned shoulder, but capable of being moved below said second shoulder and turned to lock it in position therewith to maintain the threaded portion of the bolt in projected position, and a spring interposed between said head and said cap, the bottom face of said locking portion of the cap being located at such a distance from a fixed part of the head, as to be forced into rigid engagement therewith when the threaded portion of the bolt is engaged with the threaded collar of a camera, to lock said threaded parts against unscrewing.

6. A camera support comprising a staff having its head provided with a lateral guiding portion, a bolt secured to said head coaxially with said guiding portion, and provided above the head with an enlarged guiding portion and a threaded portion, a cap having a sleeve portion surrounding the guiding portion of the head, and provided with a top friction face having a coaxial recess therein engaging the guiding portion of the bolt and normally enclosing the threaded portion, the bolt being provided with shoulders at different distances from the outer end of the screw, said cap having a locking portion for engaging either of said shoulders, and a spring interposed between said cap and said head, and a part on said head in position to be engaged by the said locking portion when the threaded portion of the bolt is engaged with the threaded collar of a camera, to lock said threaded parts against unscrewing.

7. A camera support comprising a metallic head having a cylindrical guiding portion and hinge lugs projecting outwardly from said head adjacent to the lower edge of said cylindrical portion, to receive ground supporting means, a cap having a sleeve portion fitting the guiding portion of the head, and provided with a friction top face having a central recess therein a bolt rigidly secured to said head and having a guiding portion and a terminal threaded portion extending into said recess, a spring interposed between the said cap and said head, said cap having locking portions at the bottom of said recess to engage said guiding portion of the bolt to normally hold the cap and head against the pressure of said spring, said locking portions being in position to engage said head when the threaded portion of the bolt is screwed into the threaded sleeve of a camera, to lock the engaged threaded parts against unscrewing.

8. A camera support comprising a metallic head having a cylindrical guiding portion and hinge lugs projecting outwardly from said head adjacent to the lower edge of said cylindrical portion, to receive ground supporting means, a cap having a sleeve portion fitting the guiding portion of the head, and provided with a friction top face having a central recess therein a bolt rigidly secured to said head and having a guiding portion and a terminal threaded portion extending into said recess, a spring interposed between said cap and said head, said bolt being provided with locking shoulders at different distances from the outer end of said threaded portion, and said cap having a locking portion at the bottom of said recess to engage one or other of said shoulders, and to engage a part connected with said head when the threaded part of the bolt is screwed into the threaded sleeve of a camera to lock the engaged threaded parts against unscrewing.

In testimony whereof I affix my signature.

NATHAN DUMONT POTTER.